T. K. SHEPHERD.
PUMP.
No. 176,079.　　　　　　　　Patented April 11, 1876.
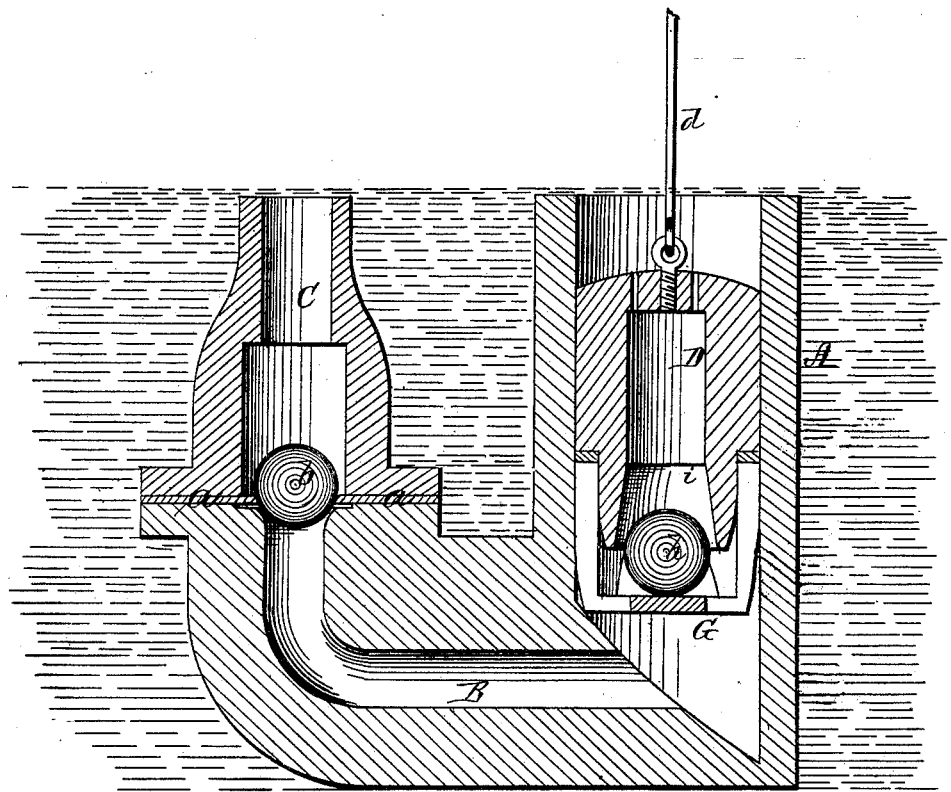
WITNESSES
Franck L. Ourased
C. L. Evert.
INVENTOR
T. K. Shepherd.
By T. H. Alexander
Attorney.

UNITED STATES PATENT OFFICE.

THOMAS K. SHEPHERD, OF OTTUMWA, IOWA.

IMPROVEMENT IN PUMPS.

Specification forming part of Letters Patent No. 176,079, dated April 11, 1876; application filed March 11, 1876.

*To all whom it may concern:*

Be it known that I, THOMAS K. SHEPHERD, of Ottumwa, in the county of Wapello and State of Iowa, have invented certain new and useful Improvements in Pumps; and I do hereby declare that the following is a full, clear, and exact description thereof, reference being had to the accompanying drawing, and to the letters of reference marked thereon, which form part of this specification.

The nature of my invention consists in the construction and arrangement of a submerged pump, as will be hereinafter more fully set forth.

In order to enable others skilled in the art to which my invention appertains to make and use the same, I will now proceed to describe its construction and operation, referring to the annexed drawing, which represents a vertical section of my pump.

A represents the pump-cylinder, open at the top, and provided at its lower end with an elbow, B, turning upward and joined to the pump-stock C. In the joint between this pump-stock and the elbow is inserted a rubber valve-seat, $a$, upon which the glass ball-valve $b$ is seated, said ball being allowed to play upward. In the cylinder A is placed the piston or plunger D, connected, by a rod, $d$, to a suitable lever or handle at the top of the well for operating the same. The plunger is either perforated or open at the top, to allow the water to pass down through it, and at its lower end is formed the valve-seat $i$, and a cage, G, is attached to and depends from the plunger. In this cage is a rubber ball-valve, $h$, to fit in and close the valve-seat $i$ at the downward stroke of the plunger. This pump is intended to rest on the bottom of the well, and be entirely submerged in the water. At the upward stroke of the piston the valve $h$ opens, allowing the water to pass downward into the cylinder, and the weight of the water in the pump-stock C keeps the valve $b$ closed. As the plunger goes down the valve $h$ closes, and the water is forced by the plunger through the elbow B, opening the valve $b$, and up through and out of the pump-stock.

Having thus fully described my invention, what I claim as new, and desire to secure by Letters Patent, is—

1. The combination of the cylinder A, elbow B, pump-stock C, horizontal rubber valve-seat $a$, forming the joint-packing, and glass ball-valve $b$, substantially as herein set forth.

2. The piston or plunger D, with openings on top, and provided with valve-seat $i$, cage G, and rubber ball-valve $h$, in combination with the cylinder A, as and for the purposes herein set forth.

In testimony that I claim the foregoing as my own I affix my signature in presence of two witnesses.

THOMAS K. SHEPHERD.

Witnesses:
  GEO. A. BROWN,
  WM. S. CHRISTIE.